US011368848B2

(12) United States Patent
Byers et al.

(10) Patent No.: US 11,368,848 B2
(45) Date of Patent: Jun. 21, 2022

(54) SENSOR FUSION FOR TRUSTWORTHY DEVICE IDENTIFICATION AND MONITORING

(71) Applicant: Cisco Technology, Inc., San Jose, CA (US)

(72) Inventors: Charles Calvin Byers, Wheaton, IL (US); M. David Hanes, Lewisville, NC (US); Gonzalo Salgueiro, Raleigh, NC (US); Dmitri Goloubev, Waterloo (BE); Joseph Michael Clarke, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 24 days.

(21) Appl. No.: 16/278,430

(22) Filed: Feb. 18, 2019

(65) Prior Publication Data

US 2020/0267543 A1 Aug. 20, 2020

(51) Int. Cl.
*H04W 12/65* (2021.01)
*G06N 20/00* (2019.01)
(Continued)

(52) U.S. Cl.
CPC ............ *H04W 12/65* (2021.01); *G06N 20/00* (2019.01); *H04W 12/009* (2019.01); *H04W 12/122* (2021.01); *H04W 12/63* (2021.01)

(58) Field of Classification Search
CPC ......... H04W 12/00504; H04W 12/009; H04W 12/00503; H04W 12/1202; G06N 20/00
See application file for complete search history.

(56) References Cited

U.S. PATENT DOCUMENTS 10,122,209 B1 * 11/2018 Salama .................... H02J 1/14
2004/0162995 A1 * 8/2004 Muaddi ................ H04W 12/12
726/23
(Continued)

OTHER PUBLICATIONS

Sandra Rodriguez-Valenzuela et al., "Distributed Service-Based Approach for Sensor Data Fusion in IoT Environments", Sensors 2014, 14, 19200-19228; doi:10.3390/s141019200, Jul. 14, 2014, 29 pages.
(Continued)

*Primary Examiner* — Lester G Kincaid
*Assistant Examiner* — Dung L Lam
(74) *Attorney, Agent, or Firm* — Edell, Shapiro & Finann, LLC (57) ABSTRACT

Presented herein are methodologies to on-board and monitor Internet of Things (IoT) devices on a network. The methodology includes receiving at a server, from a plurality of IoT devices communicating over a network, data representative of external environmental factors being experienced by individual ones of the plurality of IoT devices at a predetermined location; generating, using machine learning, an aggregated model of the external environmental factors at the predetermined location; receiving, at the server, a communication indicative that a new IoT device seeks to join the network at the predetermined location; receiving, from the new IoT device, data representative of external environmental factors being experienced by the new IoT device; determining whether there is a discrepancy between the external environmental factors of the new IoT device and the aggregated model; and when there is such a discrepancy, prohibiting the new IoT device from joining the network.

20 Claims, 7 Drawing Sheets

(51) Int. Cl.
*H04W 12/00* (2021.01)
*H04W 12/63* (2021.01)
*H04W 12/122* (2021.01)

(56) References Cited

U.S. PATENT DOCUMENTS

| | | | | |
|---|---|---|---|---|
| 2011/0314512 | A1* | 12/2011 | Sinha | H04W 12/12 726/1 |
| 2014/0324591 | A1* | 10/2014 | Kim | H04W 12/06 705/14.58 |
| 2015/0310195 | A1* | 10/2015 | Bailor | G06F 21/316 726/6 |
| 2016/0259932 | A1* | 9/2016 | Lakshmanan | G06F 21/44 |
| 2016/0371475 | A1* | 12/2016 | Zhao | G06F 21/31 |
| 2017/0180380 | A1* | 6/2017 | Bagasra | H04W 12/08 |
| 2018/0012433 | A1* | 1/2018 | Ricci | G05B 15/02 |
| 2018/0101149 | A1 | 4/2018 | Moss et al. | |
| 2018/0219920 | A1 | 6/2018 | Patel et al. | |
| 2018/0241781 | A1 | 8/2018 | Vasters | |
| 2018/0316555 | A1* | 11/2018 | Salgueiro | G06N 20/00 |
| 2019/0041845 | A1* | 2/2019 | Cella | G05B 13/028 |
| 2019/0164173 | A1* | 5/2019 | Liu | H04L 63/168 |

OTHER PUBLICATIONS

Zingbox, "What Makes IoT Security so Unique?", IoT Security Challenges, IT—OT Convergence | ZingBox IoT Security, https://www.zingbox.com/iot-security/, downloaded Feb. 18, 2019, 5 pages.

Zhengguang Shen et al., "Data Validation and Validated Uncertainty Estimation of Multifunctional Self-Validating Sensors", IEEE Transactions on Instrumentation and Measurement, vol. 62, No. 7, https://ieeexplore.ieee.org/abstract/document/6506939, Jul. 2013, 11 pages.

Jazib Frahim et al., Cisco, "Securing the Internet of Things: A Proposed Framework", https://www.cisco.com/c/en/us/about/security-center/secure-iot-proposed-framework.html#9b, downloaded Feb. 18, 2019, 9 pages.

Xin-Zeng Wu et al., "Neighbor-Neighbor Correlations Explain Measurement Bias in Networks", Scientific Reports 7:5576 DOI:10.1038/s41598-017-06042-0, https://www.ncbi.nlm.nih.gov/pmc/articles/PMC5514029/, Apr. 3, 2017, 7 pages.

Jaichandran Ravichandran et al., "Data Validation Algorithm for Wireless Sensor Networks", Hindawi Publishing Corporation, International Journal of Distributed Sensor Networks, vol. 2013, Article ID 634278, https://journals.sagepub.com/doi/full/10.1155/2013/634278, Aug. 5, 2013, 11 pages.

Cisco, "Configure Zero Touch Deployment (ZID) of VPN Remote Offices/Spokes", Document ID:200031, https://www.cisco.eom/c/en/us/support/docs/security-vpn/ipsec-architecture-implementation/200031-Zero-Touch-Deployment-ZTD-of-VPN-Remot.html, Sep. 11, 2018, 11 pages.

Cisco Systems, "Solution Guide for Cisco Network Plug and Play", Nov. 13, 2015, 25 pages.

Cisco Systems, Inc., "Solutions: Branch networking", https://meraki.cisco.com/solutions/branch-networking, downloaded Feb. 18, 2019, 8 pages.

Cisco, "Cisco Virtual Office Overview", C07-683001-00 Aug. 2011, https://www.cisco.com/c/en/us/solutions/enterprise-networks/virtual-office/guide_c07-683001.pdf, downloaded Feb. 18, 2019, 9 pages.

Cisco Systems, Inc., Meraki, "10 Ways Cisco Meraki Switches Make Life Easier", 3PP-INSERT-3, https://meraki.cisco.com/lib/pdf/meraki_switch_10_ways.pdf, downloaded Feb. 18, 2019, 16 pages.

Juniper Networks, Inc., "Zero Touch Wireless Deployment with Juniper Networks EX Series Switches and Aerohive Access Points", Configuration Guide, Jun. 2016, 23 pages.

Furqan Alam et al., "Data Fusion and IoT for Smart Ubiquitous Environments: A Survey", DOI: 10.1109/ACCESS.2017.2697839, Apr. 2017, 23 pages.

Mohammed Ali Al-Garadi et al., "A Survey of Machine and Deep Learning Methods for Internet of Things (IoT) Security", https://arxiv.org/abs/1807.11023, Jul. 29, 2018, 42 pages.

* cited by examiner

SENSOR FUSION FOR TRUSTWORTHY DEVICE IDENTIFICATION AND MONITORING

TECHNICAL FIELD

The present disclosure relates to authenticating Internet of Things (IoT) devices that are to be on-boarded onto a network and/or that are operating on the network.

BACKGROUND

Internet of Things (IoT) is a fast-emerging field. It has been estimated that approximately 50 billion IoT devices may be deployed by the end of 2020. IoT technologies can play an important role in enhancing real-life "smart" applications, such as smart healthcare, smart homes, smart transportation and smart education. At the same time, such a significant deployment of IoT devices for such diverse applications can introduce significant security challenges since IoT systems are complex and contain integrative arrangements. Moreover, an IoT device might operate in an unattended environment, possibly allowing an unauthorized person to physically access the device, and possibly replace, move, or otherwise manipulate, the IoT device. Moreover still, IoT devices may be connected via wireless networks allowing potential attackers to access private information from a communication channel through eavesdropping. Finally, given their limited computation and power resources, IoT devices generally cannot support complex security structures to help remediate at least some of the above-noted security challenges.

DESCRIPTION OF EXAMPLE EMBODIMENTS

Overview

Presented herein are techniques for determining whether to on-board a new IoT device seeking to join a network and/or to determine whether a given IoT device may have been improperly moved from a given location or its security may have been compromised. A technique includes receiving at a server, from a plurality of Internet of Things (IoT) devices communicating over a network, data representative of external environmental factors being experienced by individual ones of the plurality of IoT devices at a predetermined location. The technique further includes generating, using machine learning, an aggregated model of the external environmental factors being experienced by the individual ones of the plurality of IoT devices at the predetermined location. The technique still further includes receiving, at the server, a communication indicative that a new IoT device seeks to join the network at the predetermined location. The technique includes an operation of receiving, from the new IoT device, data representative of external environmental factors being experienced by the new IoT device. The technique further includes determining whether there is a discrepancy between the external environmental factors of the new IoT device and the aggregated model. And the technique still further includes, when there is a discrepancy between the external environmental factors of the new IoT and the aggregated model, prohibiting the new IoT device from joining the network.

A device or apparatus is also described. The device may include an interface unit configured to enable network communications, a memory, and one or more processors coupled to the interface unit and the memory, and configured to: receive at a server, from a plurality of Internet of Things (IoT) devices communicating over a network, data representative of external environmental factors being experienced by individual ones of the plurality of IoT devices at a predetermined location, generate, using machine learning, an aggregated model of the external environmental factors being experienced by the individual ones of the plurality of IoT devices at the predetermined location, receive, at the server, a communication indicative that a new IoT device seeks to join the network at the predetermined location, receive, from the new IoT device, data representative of external environmental factors being experienced by the new IoT device, determine whether there is a discrepancy between the external environmental factors of the new IoT device and the aggregated model, and, when there is a discrepancy between the external environmental factors of the new IoT and the aggregated model, prohibit the new IoT device from joining the network.

Example Embodiments

For security reasons, IoT devices should be quickly and positively identified to correctly on-board them onto/into an IoT network, and also to ensure they are not tampered with or moved during their operational life. Unfortunately, for at least the reasons mentioned in the background section above, it is difficult to prevent spoofing of their credentials and operational status, among other security challenges.

That is, a bad actor, i.e., a hacker, can spoof IoT network installation and monitoring processes, in an attempt to pass off nefarious nodes (i.e., IoT devices) as genuine nodes, which should be allowed on the network. If the ruse is successful, the hacker can complete the installation of his node, overwrite software, and potentially have unauthorized access to a network's data, traffic and capabilities. Also, genuine or authentic nodes are sometimes reconfigured or moved without authorization, and this too can cause security problems. As hackers become more clever (perhaps employing their own artificial intelligence (AI)/machine learning (ML) systems to improve their attacks), and the risk associated with hacked IoT networks become increasingly higher, owners of nodes and networks endeavor to find ever more powerful methods to authenticate and monitor their equipment.

One approach to address this spoofing problem, as will be discussed in more detail herein, is to use sensor fusion techniques or logic that leverage machine learning, where multiple physical and logical parameters are simultaneously observed for each node, where those combinations of parameters may be particularly unique to the authorized node location and environment, making it increasingly more difficult for hackers to simulate the expected environment of the system. The ML techniques described herein can establish initial parameters and dynamic changes of the sensor fusion models, thus improving the overall performance of accurately distinguishing between legitimate and rogue IoT devices attempting to join a network, and unauthorized reconfiguration or movement of previously authorized devices.

Figure 1:
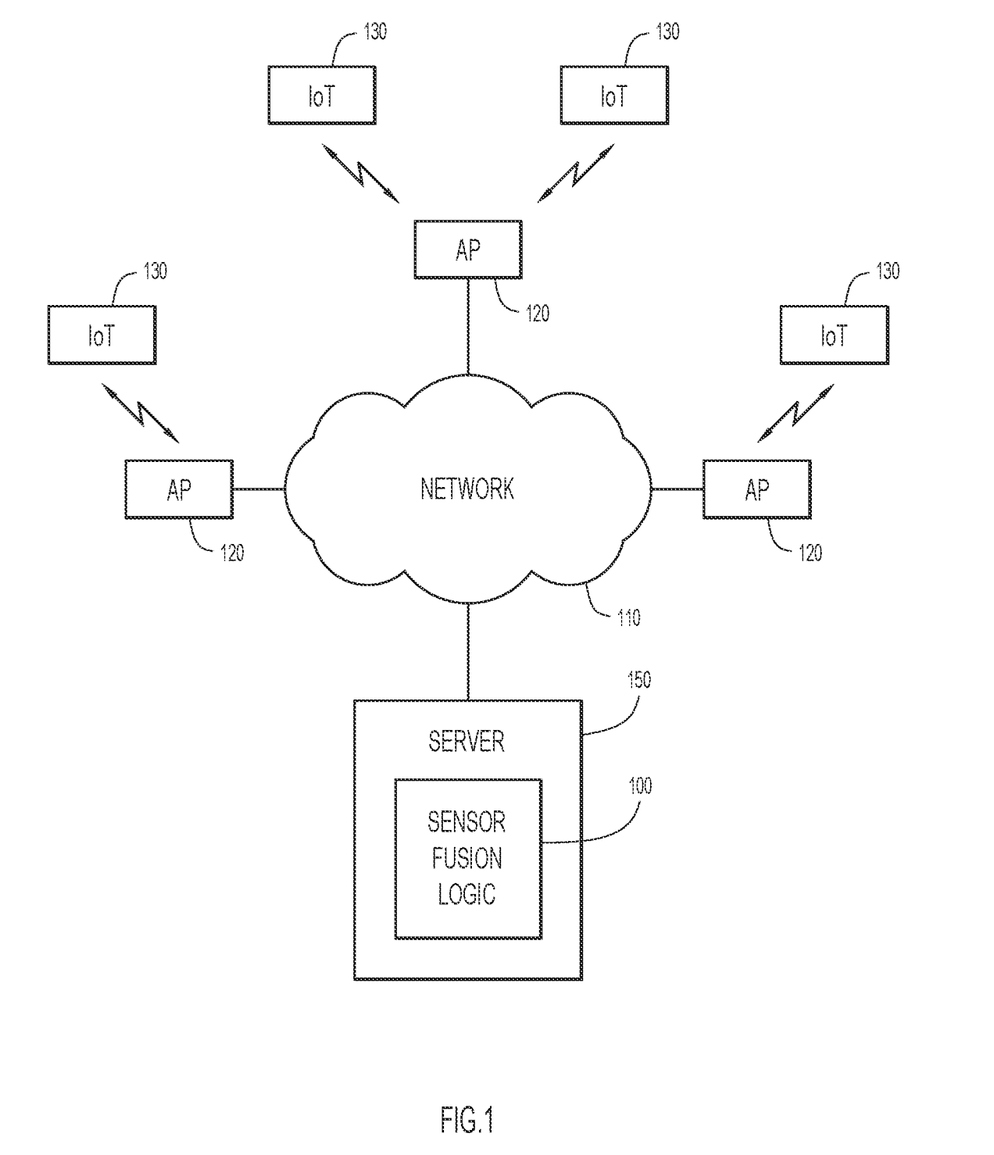
FIG. 1 depicts components of a network, including IoT devices, in which sensor fusion logic may be deployed in accordance with an example embodiment.

FIG. 1 depicts components of a network, including IoT devices, in which sensor fusion logic may be deployed in accordance with an example embodiment. In FIG. 1, a network 110, such as the Internet, interconnects network access points (APs) 120 with a server 150. Server 150 may host sensor fusion logic 100, which is described in more detail below. Multiple IoT devices 130 access network 110, e.g., via APs 120, and data from the IoT devices may thus be passed to server 150 and sensor fusion logic 100, as well as any other application that might be executing on server 150, or another server in communication with network 110.

Figure 2:
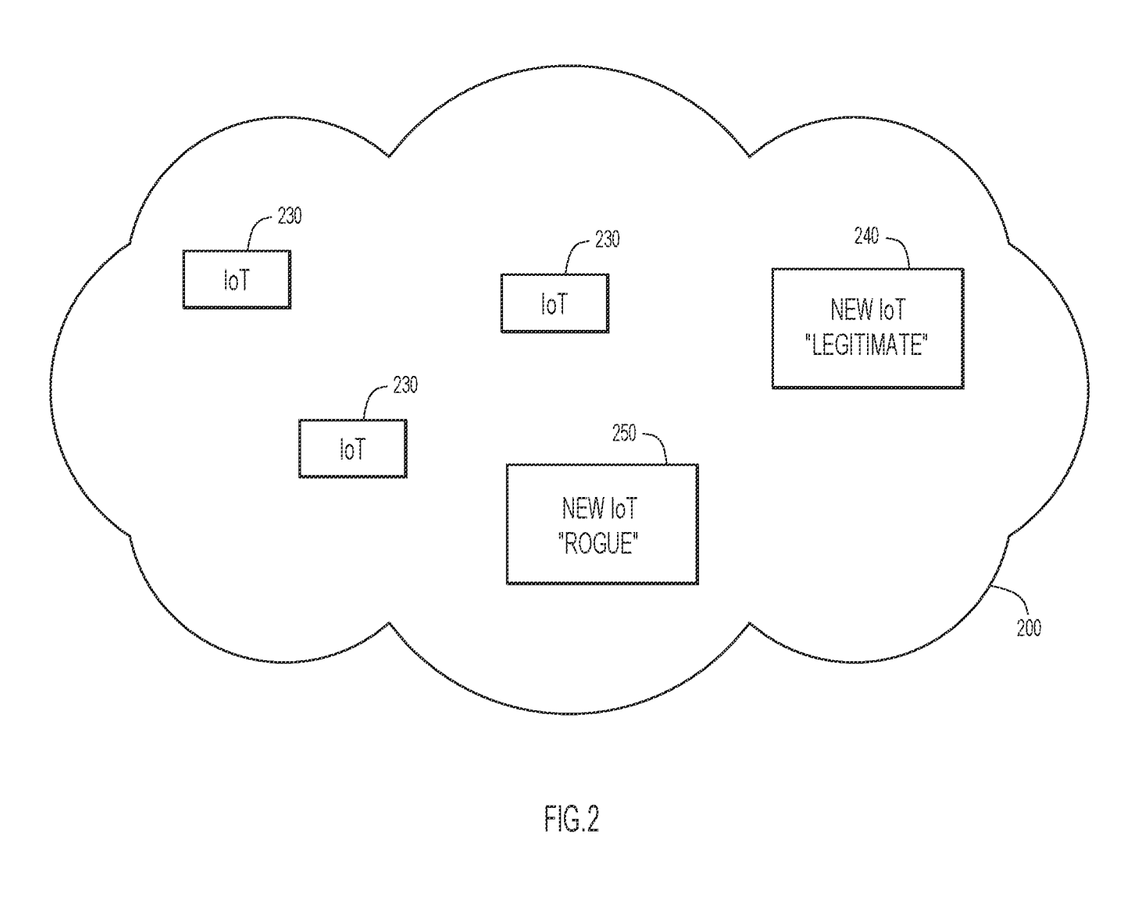
FIG. 2 shows a new, legitimate, IoT device and a new, rogue, IoT device trying to join a network in accordance with an example embodiment.

FIG. 2 shows a new, legitimate, IoT device and a new, rogue, IoT device trying to join a network in accordance with an example embodiment. Specifically, already-deployed and network-connected legitimate IoT devices 230, in a given geographical area or location 200, provide information (i.e., "external environmental factors") about their respective environments and surroundings to sensor fusion logic 100 (not shown in FIG. 2). The external environmental factors are measured by sensors on nodes in and around location 200 and are then supplied to a machine learning (ML) process executed or controlled by sensor fusion logic 100 so that a model of the environment in geographical location 200 can be established. Then, when a new IoT device 240 attempts to join the network 110, information about its environment and surroundings (i.e., the new IoT device's 240 external environmental factors) can be measured by sensors on device 240 and compared with the model, and allowed to join the network when there is sufficient correspondence therebetween.

On the other hand, external environmental factors with respect to, and received from, a new, rogue, IoT device 250, or other device masquerading as an IoT device, might not sufficiently match the model and, as such, rogue IoT device 250 would not be allowed to join the network. The reason for a mismatch is that new rogue device 250 is not in the boundaries of location 200, or does not share the network and physical context with existing IoT devices 230, and therefore cannot correctly measure the location specific physical parameters. Similarly, if a given one of the legitimate, already-deployed and network-connected, IoT devices 230 in the given geographical location 200 begins to supply external environmental factors that are inconsistent with the model, such an IoT device might be considered to have been moved without authorization.

In this vein, sensor fusion logic 100 may employ multiple sensor fusion techniques to generate high confidence identification, authentication, and operational status monitoring of large distributed networks of IoT devices. For devices that are connected with wireless links to edge gateways or fog nodes (e.g., APs 120), the following are examples of sensor data and data sources that can be fused, and their readings processed by sensor fusion logic 100 (including machine learning logic) to build a more trustworthy network (i.e., create a model and then use that model to determine the legitimacy of a new IoT device that is seeking to join the network):

Device serial number/SIM card contents
Local storage contents
RF signature
Reported GPS position
Round trip link latency
Packet flow statistics
CPU/memory occupancy levels
Angle of radio signal arrival in MIMO
RF signal strengths reported to multiple nearby fixed nodes or broadcast stations
Acoustic correlations from a device with microphones
Lighting or image correlations between devices with light sensors or cameras
Signals received or transmitted by a technician's portable devices
Signal pattern transmitted at random time intervals
Signals received by passing mobile nodes
Power supply variation readings.
External weather sensors (temperature, humidity, wind, barometric pressure)

Other examples of sensor data and data sources that can be fused, and which, in some cases, might be more relevant to hardwired endpoints include:

Cable pair/fiber ID
Round trip latency
MAC address
PoE measurements (if used)
Bit timing variations
Clock jitter
Adjacent wire crosstalk readings.

The foregoing lists provide examples of multiple physical parameters for the distributed sensors to measure that, when considered together, may be difficult for a nefarious or incorrectly positioned node to estimate or simulate.

In an embodiment, a subset or all of the sensor readings are compared to a detailed deployment model of the device that may consider its factory-supplied identity, intended installation location and interconnect circumstances. Artificial intelligence (AI)/machine learning (ML) techniques, implemented by sensor fusion logic 100, are used to create and continuously adjust the model. If sensor fusion parameters (i.e., external environmental factors) stray outside the calculated normal values, various levels of alarms may be generated and remedial actions may be initiated. This may help prevent unauthorized devices from joining the network, determine if software on a given node is compromised, and/or determine if a device is not installed at its authorized location, or has been tampered with or moved. Such a system should be relatively difficult to spoof given all of its fused sensor modes, and may be sensitive to many classes of attacks and abnormal conditions that would otherwise go unnoticed.

There are several sensor fusion models that may be implemented by sensor fusion logic 100 in accordance with an example embodiment. Specifically, sensor fusion logic 100 may take advantage of all, or a subset of, sensors (and the external environmental factors measured thereby) installed on a device to help prove its authenticity. For example, if a device has a microphone, loud noises in the neighborhood (traffic, thunder, etc.) may be time correlated with signals from microphones nearby trusted nodes in a way that is consistent with the exact location of the device and the position of the source of the sound. If the device has an image or light sensor, sensor fusion logic 100 may monitor for sunrise/sunset or indoor lighting on/off times or try to correlate objects appearing in images from nearby cameras in other devices.

In another example, if the physical IoT device being monitored is visible on one or more security camera feeds, the sensor fusion logic 100 may verify that such security cameras can see the IoT device from all possible angles and the monitored IoT device is in its intended location. If the IoT device is commanded to blink its pilot or status lights, those same security cameras can observe the same, and have even more assurance that the IoT device is authentic. The correctly time correlated response of a camera on a first device detecting a pilot light flash on a nearby device would be almost impossible for a hacker to simulate for a nefarious device.

Likewise, the angle of arrival, signal strength, round trip latency, and other RF propagation parameters for the wireless links and also the precise signals received from broadcast stations (for example AM radio) may be difficult to spoof, when taken together.

If the IoT device monitors its power supply, various transients (e.g., voltage dips when a building's air conditioning compressor or elevator starts) can be correlated between nearby devices (this may be very difficult to spoof on a rogue device that is not in the same building). The more of these sensor modes the ML is able to fuse together, the more sensitive the monitoring, and secure the system may be.

In accordance with an embodiment, sensor fusion logic 100 employs machine learning since estimation of the multiple expected sensor fusion observations, and the establishment of limits for declaring an alarm, may be relatively difficult to process. ML systems can be trained with many similar installations, and have a good starting point for the expected values even before a new node, i.e., a new IoT device 240, attempts to join the network 110. Also, the various sensor parameters may change over time, and ML systems can learn and anticipate these changes. For example, if a food truck parks in front a monitored node about the same time every day, the RF signal strength dip it causes may be predictable by ML, and actually usable as one parameter of the node's expected response.

Another example is packet latency for packets from an IoT node to a central node/gateway, e.g., server 150. Latency most often varies with load and depends on the path followed. This can be modeled by machine learning implemented by sensor fusion logic 100. If a node has been moved from a first network (or location) to a second network (or location), for example, such tampering can be detected by virtue of having a learned model of latency for the first network (or location). This will work even if IP address/TTL parameters are spoofed. Server 150 will typically track many IoT nodes on a network and would, thus, have sufficient data to train a representative model. Sensor fusion logic 100 can thus learn a packet delay model and this data can be fused with other sensor data to make it even more difficult to spoof (for example fusing with measurements of local CPU load).

Sensor fusion logic 100 may trigger several retransmits to collect enough samples to make a determination of whether latency matches expected distribution. Using machine learning versus statistical methods enables fusing additional sensor data, learning individual input ranges and patterns of dependencies between sensor data. In the case of an IoT device being moved within the same network, latency change can be detected with a device-specific latency machine learning model. Generative Adversarial Network as well as other methods can work in this context (for example Variational Autoencoders (VAE) or Long Short Term Memory (LSTM) Recurrent neural network (RNN). Kullback-Leibler divergence may be used as one of many possible metrics to detect and measure deviation.

Over time, the ML processes of sensor fusion logic 100 are configured to learn the acceptable ranges of each sensor parameter, and how the sensor fusion based readings are correlated. This can greatly reduce the frequency of false positive and false negative alarms.

Figure 3:
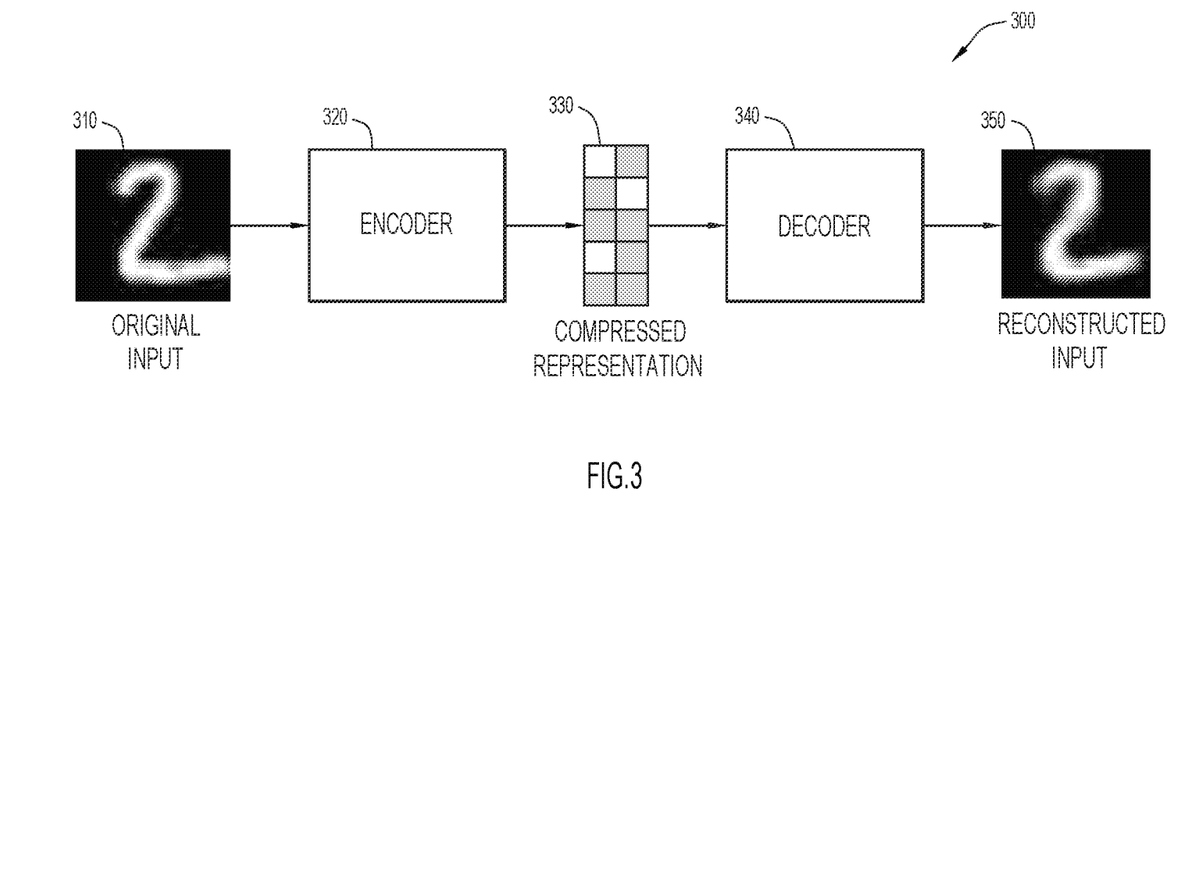
FIG. 3 shows the use of an encoder and decoder in accordance with an example embodiment.

In one approach, as shown in FIG. 3, sensor fusion logic 100 may include an Autoencoder 300, comprised of an encoder 320 and decoder 340, is used to represent sensor data of an IoT device (authenticated). That is, original sensor data 310 of an authenticated IoT device is input to encoder 320, which outputs a compressed representation 330 of the original sensor data 310. A decoder 340 decodes the compressed representation 330 and outputs a reconstructed input 350. This allows the system to monitor the IoT device and detect tampering by monitoring Autoencoder reconstruction error distribution on new sensor readings.

Figure 4:
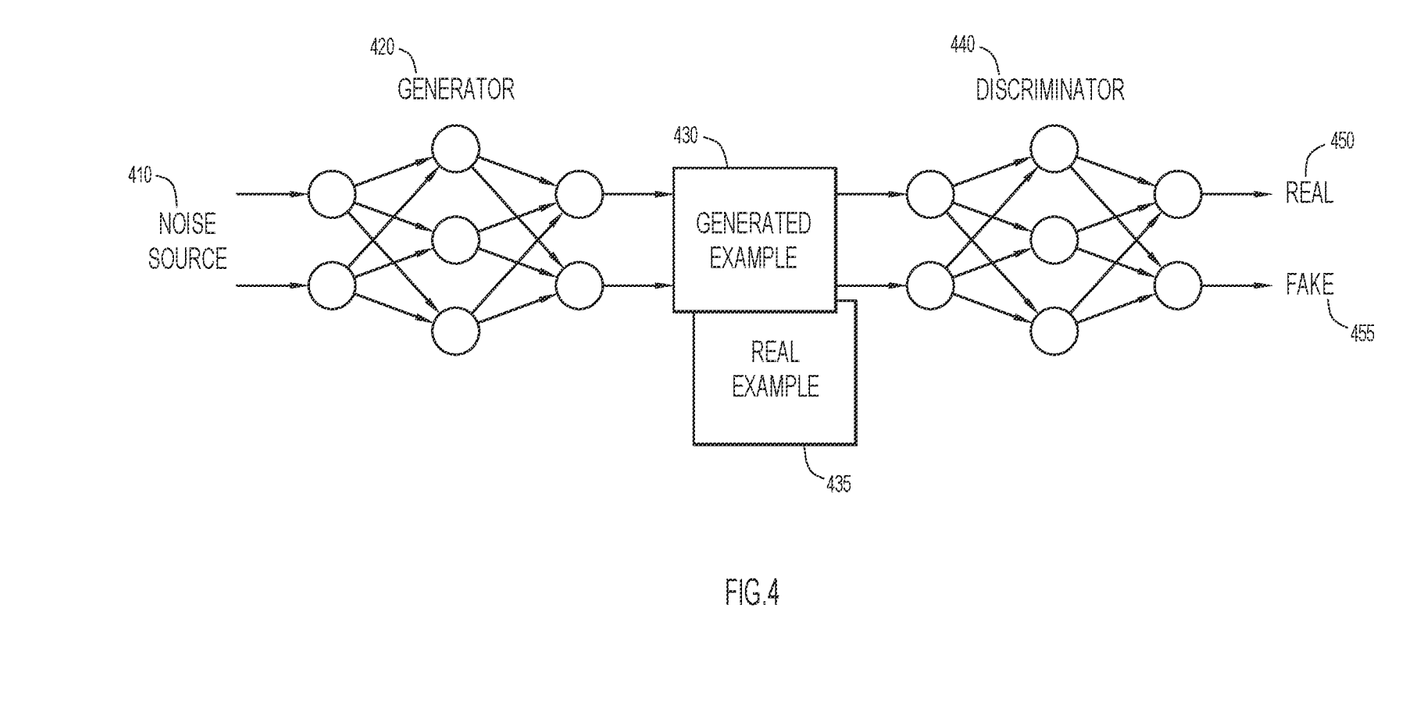
FIG. 4 shows a generative adversarial network including a discriminator to distinguish devices in accordance with an example embodiment.

If assumptions can be made that devices close by sense selected shared properties of the environment, then further models can be made with, for example, a Generative Adversarial Network where a Discriminator Network which is trained to tell apart the devices that share 'commonly sensed' environments from devices in other environments (for example similar devices from different street/district/city/state/country). FIG. 4 shows a Generative Adversarial Network, which may be implemented by sensor fusion logic 100, including a discriminator to distinguish devices in accordance with an example embodiment. Specifically, a noise source 410 supplies input data to a generator 420, which outputs a generated example 430 and a real example 435. Generated examples 430 and 435 are then supplied to a discriminator 440 that outputs an indication as to whether the generated examples 430, 435 are real 450 or fake 455.

As a variation, an approach can be used where legitimate devices have some of their sensor data randomly modified. The ML processes of sensor fusion logic 100 can be configured to pick out these variations, and use them in its determination of a device's authenticity (because rogue devices without the same seed values and crypto keys presumably would not modify the data in the same way).

Figure 5:
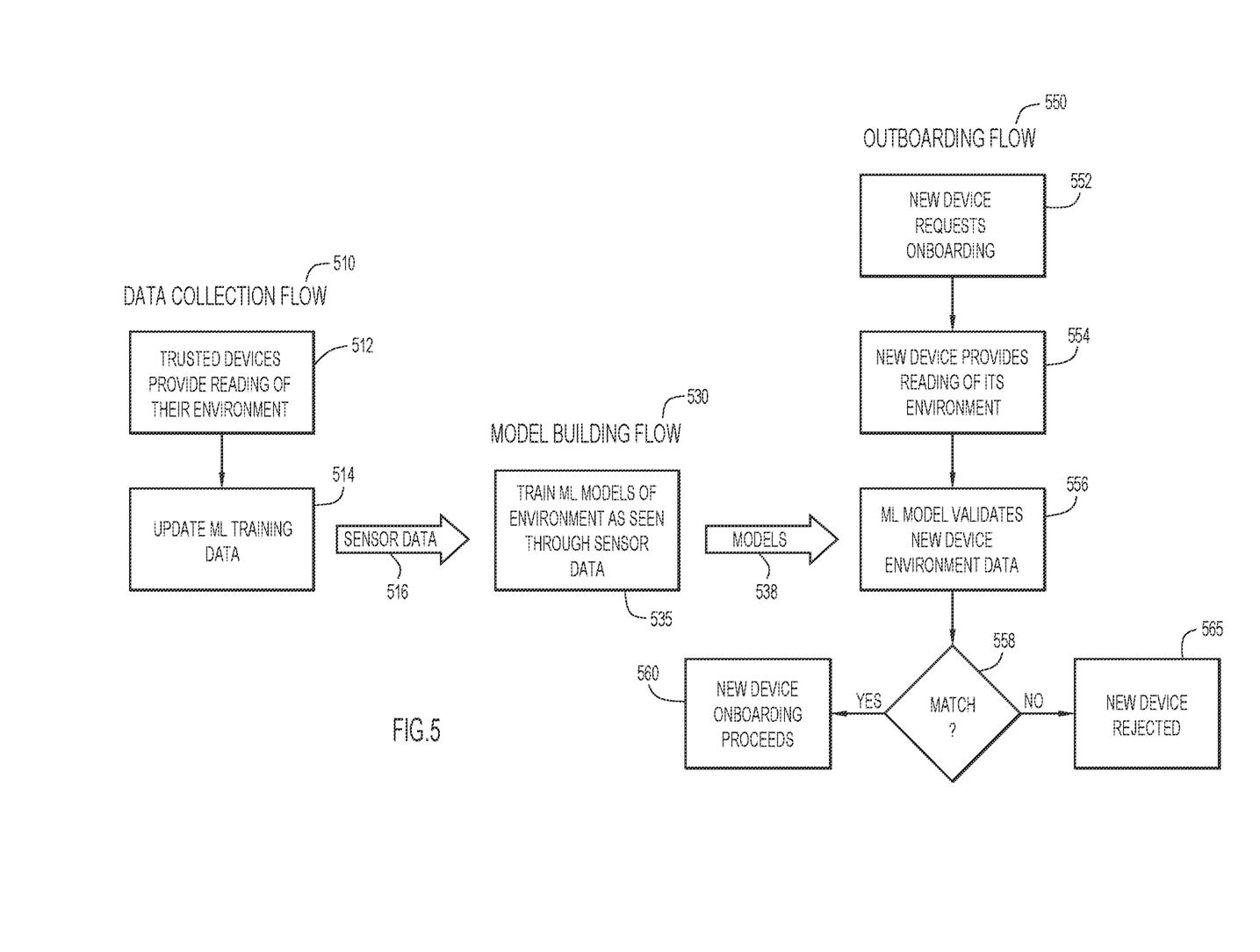
FIG. 5 is a flow chart depicting a series of operations performed by sensor fusion logic and configured to determine whether to accept or reject a given new device trying to join the network in accordance with an example embodiment.

FIG. 5 is a flow chart depicting a series of operations performed by sensor fusion logic 100 configured to determine whether to accept or reject a given new IoT device into the network in accordance with an example embodiment. The main flows or processes are: a data collection flow 510 resulting in sensor data 516, a model building flow 530 resulting in models 538, and an onboarding flow 550 that is configured to make a determination as to whether to onboard a given IoT device given its collection of external environmental factors, and how such factors compare to the generated model.

More specifically, at 512, trusted IoT devices, e.g., devices 230 in FIG. 2, provide readings representative of their respective external environmental factors. Such factors may include, e.g., sounds from device microphones, temperature, elevation, humidity, barometric pressure, air quality, electro/mechanical noise, vibration, light sensor data, among other possible parameters, including those listed previously. At 514, these readings are used to update ML training data employed by sensor fusion logic 100, resulting in sensor data 516. Sensor data 516 is then used by sensor fusion logic 100 to train, at 535, ML models of the environment or location in which IoT devices 230 are deployed. In an embodiment, sensor fusion logic 100 may be configured to balance a subset of the available readings (external environmental factors) with respect to providing relatively high accuracy and security versus lowest network overhead. Resulting models 538 are then made available during the onboarding flow 550.

In the onboarding flow 550, at 552, a new IoT device seeks to join the network. At 554, the new IoT device activates its sensors and provides data representative of readings of its external environmental factors. At 556, the ML model built by sensor fusion logic 100 is used to validate and/or authenticate the new IoT device by comparing the readings of the external environmental factors of the new IoT device with the built ML model. At 558, sensor fusion logic 100 determines if a match is made. If a match is made, the onboarding of the new IoT device proceeds at 560. If there is a sufficient discrepancy between the external environmental factors of the new IoT and the ML model(s) built by sensor fusion logic 100, the new IoT device is rejected at 565.

As an example, assume that all IoT nodes in a building are AC powered, and all such devices measure their AC waveforms and report the time and amplitude of any power transients. A newly on-boarded device reports its readings to sensor fusion logic 100. If a transient is observed by two or more existing devices in the building, sensor fusion logic 100 averages their time and amplitude, and can have high confidence that the new device is in the building if the time of any transients it reports is within 20 milliseconds, and 20% amplitude of the average values.

For still more accuracy, the above example can be fused with more sensing modes. All devices could record the timing of IoT beacon packets from the building's access point. If their times do not correlate within a millisecond, that could be grounds for rejection.

In a third mode, sensor fusion logic 100 might consider round trip network latency to server 150 that should match to within 10 milliseconds.

Of course, those skilled in the art will appreciate that the foregoing specific examples are not meant to limit the embodiments described and claimed herein.

Figure 6:
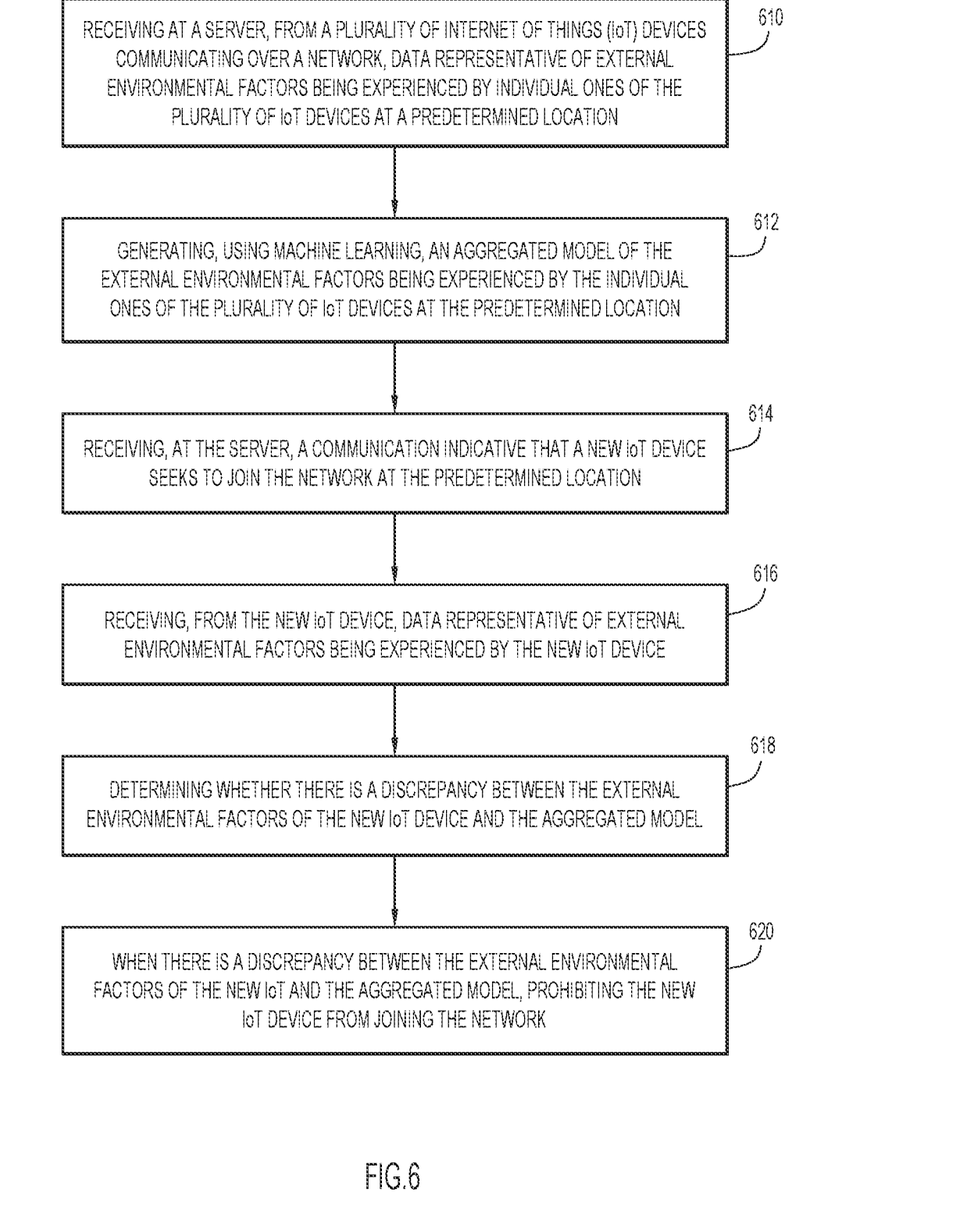
FIG. 6 is another flow chart depicting a series of operations that may be performed by sensor fusion logic in accordance with an example embodiment.

FIG. 6 is another flow chart depicting a series of operations that may be performed by sensor fusion logic in accordance with an example embodiment. At 610, an operation includes receiving at a server, from a plurality of Internet of Things (IoT) devices communicating over a network, data representative of external environmental factors being experienced by individual ones of the plurality of IoT devices at a predetermined location. At 612, an operation includes generating, using machine learning, an aggregated model of the external environmental factors being experienced by the individual ones of the plurality of IoT devices at the predetermined location. At 614, an operation includes receiving, at the server, a communication indicative that a new IoT device seeks to join the network at the predetermined location. At 616, an operation includes receiving, from the new IoT device, data representative of external environmental factors being experienced by the new IoT device. At 618, an operation includes determining whether there is a discrepancy between the external environmental factors of (e.g., measured and reported by) the new IoT device and the aggregated model. And at 620, an operation includes, when there is a discrepancy between the external environmental factors of the new IoT and the aggregated model, prohibiting the new IoT device from joining the network.

Thus, as will be appreciated by one of ordinary skill in the art, embodiments described herein are configured to fuse data from multiple sensors on monitored nodes and throughout the network to verify a node is authentic and located where it is expected. These sensing modes can include: configuration data internal to a node, various parameters associated with its wireless or wireline connection to the network, acoustic sensors, light/image sensors, position sensors, environmental sensors, power supply variations, and observations from nearby fixed or mobile network nodes about the monitored node.

The embodiments also employ AI/ML techniques to determine an initial set of correlated sensor values to help authenticate a node during its installation and on-boarding. AI/ML techniques may also be used to continuously adjust the expected fused sensor readings from a node to account for variations that will inevitably happen.

Autoencoder or Generative Adversarial Network approaches to correlate and analyze fused sensor readings from IoT devices may be implemented.

The embodiments also include generating various alarms based upon the sensor fusion readings processed via the ML to indicate a node may have been hacked or relocated, potentially using these alarms to automatically prevent onboarding a suspicious node or to isolate a node that has started demonstrating potentially errant behavior.

When taken together, sensor fusion based sensing may make it very difficult for hackers to simulate a device's environment, and therefore gain control over it.

These techniques represent a significant advance on the state of the art in IoT device identification, on-boarding and monitoring. In order to spoof such a system, a hacker might have to simulate multiple parameters, many of which are location dependent, to convince sensor fusion logic 100 that a new node is authentic. For example, any such simulation would have to be very closely time correlated with the readings from nearby devices and the ML models, making a convincing spoof even harder. Abnormal changes in node behavior may be easier to spot if they impact multiple sensing modalities. The machine learning techniques described herein may continuously adapt to changing node environments, and (with sufficient training) can achieve best-in-class threat detection sensitivities, false positive alarm rates, and false negative alarm rates. Overall, the described techniques may make IoT systems more trustworthy.

As will be appreciated by those skilled in the art, the embodiments described herein leverage machine learning to, among other things, learn thresholds for individual sensors, learn patterns of co-dependencies/correlations between parameters, learn an individual model (sensor signature) of each IoT device instance, learn an environment model (e.g., what properties of the environment every device in that environment might/should see through its sensors), and fuse selected sensor data. This makes it possible to take input sensor readings, process them with ML to produce an intermediate (fused) representation that can be used for further processing (e.g., with heuristics, statistics and still more ML).

Figure 7:
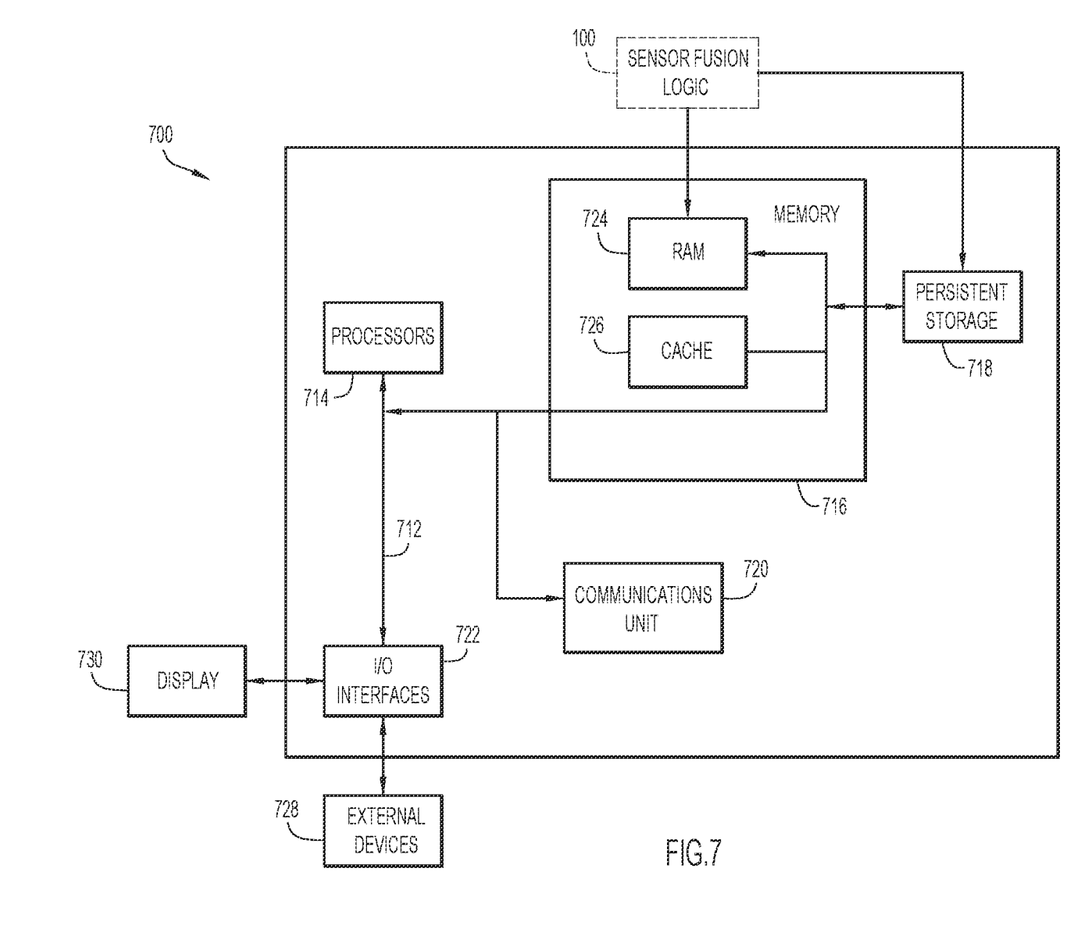
FIG. 7 depicts a device (e.g., a server) that might host and execute the sensor fusion logic in accordance with an example embodiment.

FIG. 7 depicts a device (e.g., a server) that might host and execute the sensor fusion logic in accordance with an example embodiment. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media.

One or more programs (e.g., sensor fusion logic 100) may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 714, cause the computing device 700 to perform the operations of modeling the external environmental factors of multiple IoT devices described herein in connection with the accompanying figures.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving at a server, from a plurality of Internet of Things (IoT) devices communicating over a network, data representative of external environmental factors being experienced by individual ones of the plurality of IoT devices at a predetermined location; generating, using machine learning, an aggregated model of the external environmental factors being experienced by the individual ones of the plurality of IoT devices at the predetermined location; receiving, at the server, a communication indicative that a new IoT device seeks to join the network at the predetermined location; receiving, from the new IoT device, data representative of external environmental factors being experienced by the new IoT device; determining whether there is a discrepancy between the external environmental factors of the new IoT device and the aggregated model; and when there is a discrepancy between the external environmental factors of the new IoT and the aggregated model, prohibiting the new IoT device from joining the network.

In an embodiment, the data representative of external environmental factors being experienced by individual ones of the plurality of IoT devices at a predetermined location may include at least one of GPS position, round trip link latency, angle of radio signal arrival, or signal strengths reported to nearby fixed nodes or broadcast stations.

In an embodiment, generating, using machine learning, the aggregated model of the external environmental factors being experienced by individual ones of the plurality of IoT devices at the predetermined location may include at least one of generating acoustic correlations from individual ones of the plurality of IoT devices having a microphone and generating lighting correlations between individual ones of the plurality of IoT devices having a light sensor.

The method may further include adjusting the aggregated model of the external environmental factors being experienced by individual ones of the plurality of IoT devices at the predetermined location over the course of a predetermined period of time.

In one possible implementation, determining whether there is a discrepancy between the external environmental factors of the new IoT and the aggregated model may include processing the external environmental factors of the new IoT device with an autoencoder In an embodiment, the method may still further include generating a second aggregated model based on the aggregated model using a generative adversarial network, and the method may still also include determining whether there is a discrepancy between the external environmental factors of the new IoT device and the second aggregated model.

The method may include modifying at least a portion of the data representative of the external environmental factors being experienced by individual ones of the plurality of IoT devices at the predetermined location.

In an implementation, determining whether there is a discrepancy between the external environmental factors of the new IoT device and the aggregated model may further include determining the discrepancy based on knowledge that the at least a portion of the data has been modified.

The method may still further include generating an alarm when there is a discrepancy between the external environmental factors of the new IoT and the generated aggregated model.

In another form, a device may also be provided in accordance with an embodiment. The device may include an interface unit configured to enable network communications; a memory; and one or more processors coupled to the interface unit and the memory, and configured to: receive from a plurality of Internet of Things (IoT) devices communicating over a network, data representative of external environmental factors being experienced by individual ones of the plurality of IoT devices at a predetermined location; generate, using machine learning, an aggregated model of the external environmental factors being experienced by individual ones of the plurality of IoT devices at the predetermined location; receive a communication indicative that a new IoT device seeks to join the network at the predetermined location; receive, from the new IoT device, data representative of external environmental factors being experienced by the new IoT device; determine whether there is a discrepancy between the external environmental factors of the new IoT device and the aggregated model; and when there is a discrepancy between the external environmental factors of the new IoT and the aggregated model, prohibit the new IoT device from joining the network.

In an embodiment, the data representative of external environmental factors being experienced by individual ones of the plurality of IoT devices at a predetermined location may include at least one of GPS position, round trip link latency, angle of radio signal arrival, or signal strengths reported to nearby fixed nodes or broadcast stations.

In an embodiment, the one or more processors may be configured to generate, using machine learning, the aggregated model of the external environmental factors being experienced by individual ones of the plurality of IoT devices at the predetermined location by at least one of generating acoustic correlations from individual ones of the plurality of IoT devices having a microphone and generating lighting correlations between individual ones of the plurality of IoT devices having a light sensor.

The one or more processors may be configured to adjust the aggregated model of the external environmental factors being experienced by individual ones of the plurality of IoT devices at the predetermined location over the course of a predetermined period of time.

In one possible implementation, the one or more processors may be configured to determine whether there is a discrepancy between the external environmental factors of the new IoT and the aggregated model by processing the external environmental factors of the new IoT device with an autoencoder.

In still another form, a non-transitory computer readable storage media is provided that is encoded with instructions that, when executed by a processor, cause the processor to receive from a plurality of Internet of Things (IoT) devices communicating over a network, data representative of external environmental factors being experienced by individual ones of the plurality of IoT devices at a predetermined location; generate, using machine learning, an aggregated model of the external environmental factors being experienced by individual ones of the plurality of IoT devices at the predetermined location; receive a communication indicative that a new IoT device seeks to join the network at the predetermined location; receive, from the new IoT device, data representative of external environmental factors being experienced by the new IoT device; determine whether there is a discrepancy between the external environmental factors of the new IoT device and the aggregated model; and when there is a discrepancy between the external environmental factors of the new IoT and the aggregated model, prohibit the new IoT device from joining the network In an embodiment, the data representative of external environmental factors being experienced by individual ones of the plurality of IoT devices at a predetermined location may include at least one of GPS position, round trip link latency, angle of radio signal arrival, or signal strengths reported to nearby fixed nodes or broadcast stations The instructions may further include instructions that, when executed by a processor, cause the processor to.

The instructions may further include instruction that, when executed by a processor, cause the processor to generate, using machine learning, the aggregated model of the external environmental factors being experienced by individual ones of the plurality of IoT devices at the predetermined location by at least one of generating acoustic correlations from individual ones of the plurality of IoT devices having a microphone and generating lighting correlations between individual ones of the plurality of IoT devices having a light sensor.

The instructions may further include instruction that, when executed by a processor, cause the processor to adjust the aggregated model of the external environmental factors being experienced by individual ones of the plurality of IoT devices at the predetermined location over the course of a predetermined period of time.

The above description is intended by way of example only. Various modifications and structural changes may be made therein without departing from the scope of the concepts described herein and within the scope and range of equivalents of the claims.

What is claimed is:

1. A method comprising:
    receiving at a server, from a plurality of Internet of Things (IoT) devices communicating over a network, data representative of external environmental factors being experienced by individual ones of the plurality of IoT devices at a predetermined location, wherein the external environmental factors include signals transmitted by portable devices at the predetermined location;
    generating, using machine learning, an aggregated model of the external environmental factors being experienced by the individual ones of the plurality of IoT devices at the predetermined location including correlating the signals transmitted by portable devices;
    receiving, at the server, a communication indicative that a new IoT device seeks to join the network at the predetermined location;
    receiving, from the new IoT device, data representative of external environmental factors being experienced by the new IoT device;
    determining that there is a discrepancy between the external environmental factors including the signals transmitted by portable devices sensed by the new IoT device and the aggregated model and then prohibiting the new IoT device from joining the network.

2. The method of claim 1, wherein the data representative of external environmental factors being experienced by individual ones of the plurality of IoT devices at a predetermined location comprises at least one of GPS position, round trip link latency, angle of radio signal arrival, or signal strengths reported to nearby fixed nodes or broadcast stations.

3. The method of claim 1, wherein generating, using machine learning, the aggregated model of the external environmental factors being experienced by individual ones of the plurality of IoT devices at the predetermined location comprises at least one of generating acoustic correlations from individual ones of the plurality of IoT devices having a microphone and generating lighting correlations between individual ones of the plurality of IoT devices having a light sensor.

4. The method of claim 1, further comprising adjusting the aggregated model of the external environmental factors being experienced by individual ones of the plurality of IoT devices at the predetermined location over a predetermined period of time.

5. The method of claim 1, wherein determining whether there is a discrepancy between the external environmental factors sensed by the new IoT device and the aggregated model comprises processing the external environmental factors of the new IoT device with an autoencoder.

6. The method of claim 1, further comprising generating a second aggregated model based on the aggregated model using a generative adversarial network.

7. The method of claim 6, further comprising determining whether there is a discrepancy between the external environmental factors sensed by the new IoT device and the second aggregated model.

8. The method of claim 1, further comprising modifying at least a portion of the data representative of the external environmental factors being experienced by individual ones of the plurality of IoT devices at the predetermined location.

9. The method of claim 8, wherein determining whether there is a discrepancy between the external environmental factors sensed by the new IoT device and the aggregated model further comprises determining the discrepancy based on knowledge that the at least a portion of the data representative of the external environmental factors has been modified.

10. The method of claim 1, generating an alarm when there is a discrepancy between the external environmental factors sensed by the new IoT device and the generated aggregated model.

11. A device comprising:
an interface unit configured to enable network communications;
a memory; and
one or more processors coupled to the interface unit and the memory, and configured to:
receive from a plurality of Internet of Things (IoT) devices communicating over a network, data representative of external environmental factors being experienced by individual ones of the plurality of IoT devices at a predetermined location, wherein the external environmental factors include signals transmitted by portable devices at the predetermined location;
generate, using machine learning, an aggregated model of the external environmental factors being experienced by individual ones of the plurality of IoT devices at the predetermined location including correlating the signals transmitted by portable devices;
receive a communication indicative that a new IoT device seeks to join the network at the predetermined location;
receive, from the new IoT device, data representative of external environmental factors being experienced by the new IoT device;
determine that there is a discrepancy between the external environmental factors including the signals transmitted by portable devices sensed by the new IoT device and the aggregated model and then prohibit the new IoT device from joining the network.

12. The device of claim 11, wherein the data representative of external environmental factors being experienced by individual ones of the plurality of IoT devices at a predetermined location comprises at least one of GPS position, round trip link latency, angle of radio signal arrival, or signal strengths reported to nearby fixed nodes or broadcast stations.

13. The device of claim 11, wherein the one or more processors are configured to generate, using machine learning, the aggregated model of the external environmental factors being experienced by individual ones of the plurality of IoT devices at the predetermined location by at least one of generating correlations of lighting signals sensed by individual ones of the plurality of IoT devices having a light sensor and generating acoustic correlations from individual ones of the plurality of IoT devices having a microphone.

14. The device of claim 11, wherein the one or more processors are configured to adjust the aggregated model of the external environmental factors being experienced by individual ones of the plurality of IoT devices at the predetermined location over a predetermined period of time.

15. The device of claim 11, wherein the one or more processors are configured to determine whether there is a discrepancy between the external environmental factors sensed by the new IoT device and the aggregated model by processing the external environmental factors of the new IoT device with an autoencoder.

16. The device of claim 11, wherein the one or more processors are configured to generate a second aggregated model based on the aggregated model using a generative adversarial network.

17. A non-transitory computer readable storage media encoded with instructions that, when executed by a processor, cause the processor to:
receive from a plurality of Internet of Things (IoT) devices communicating over a network, data representative of external environmental factors being experienced by individual ones of the plurality of IoT devices at a predetermined location, wherein the external environmental factors include signals transmitted by portable devices at the predetermined location;
generate, using machine learning, an aggregated model of the external environmental factors being experienced by individual ones of the plurality of IoT devices at the predetermined location including correlating the signals transmitted by portable devices;
receive a communication indicative that a new IoT device seeks to join the network at the predetermined location;
receive, from the new IoT device, data representative of external environmental factors being experienced by the new IoT device;
determine that there is a discrepancy between the external environmental factors including the signals transmitted by portable devices sensed by the new IoT device and the aggregated model and then prohibit the new IoT device from joining the network.

18. The non-transitory computer readable storage media of claim 17, wherein the data representative of external environmental factors being experienced by individual ones of the plurality of IoT devices at a predetermined location comprises at least one of GPS position, round trip link latency, angle of radio signal arrival, or signal strengths reported to nearby fixed nodes or broadcast stations.

19. The non-transitory computer readable storage media of claim 18, further including instructions that, when executed by a processor, cause the processor to generate, using machine learning, the aggregated model of the external environmental factors being experienced by individual ones of the plurality of IoT devices at the predetermined location by at least one of generating correlations of acoustic signals sensed by individual ones of the plurality of IoT devices having a microphone and generating lighting correlations between individual ones of the plurality of IoT devices having a light sensor.

20. The non-transitory computer readable storage media of claim 19, further including instructions that, when executed by a processor, cause the processor to adjust the aggregated model of the external environmental factors being experienced by individual ones of the plurality of IoT devices at the predetermined location over a predetermined period of time.

\* \* \* \* \*